United States Patent [19]

Pope

[11] Patent Number: 4,578,246

[45] Date of Patent: Mar. 25, 1986

[54] APPARATUS FOR MAKING SOAP

[76] Inventor: Lonnie H. Pope, 3915 Post Oak Tritt, Marietta, Ga. 30062

[21] Appl. No.: 591,212

[22] Filed: Mar. 19, 1984

[51] Int. Cl.⁴ .......................... B01J 4/02; B01F 7/20; B01F 15/02
[52] U.S. Cl. .................................. 422/111; 366/151; 422/129.1; 422/225
[58] Field of Search ................ 252/371, 362; 366/151; 422/111, 129, 225, 129.1

[56] References Cited

U.S. PATENT DOCUMENTS

| 64,099 | 8/1867 | Hardy. | |
|---|---|---|---|
| 2,362,734 | 11/1944 | Ward | 252/371 |
| 2,800,398 | 7/1957 | Morrison. | |
| 2,876,082 | 3/1959 | Morrison. | |
| 2,879,143 | 3/1959 | Thurman. | |
| 4,027,859 | 6/1977 | Stone | 366/151 |
| 4,397,561 | 8/1983 | Stong et al. | 366/101 |

FOREIGN PATENT DOCUMENTS

0739498  6/1980  U.S.S.R. .............................. 366/151

Primary Examiner—Peter Kratz
Attorney, Agent, or Firm—Thomas & Kennedy

[57] ABSTRACT

Liquid soap is made in small quantities in the home by mixing a fat, such as left over cooking fats, with an alkali while adding a diluent each time viscosity of the mixture is detected to rise. Apparatus for making the soap includes a sealed container 17 with compartments filled with the alkali and other additives, with the sealed container having protrusions 68 which engage switch elements 69 that control the amounts of each additive to be mixed with the fats. A tiltable baffle 78 feeds the grease added to the system alternately to one of two grease receptacles 75 or 76, a D.C. motor drives a mixer 55, and water from a water tank 30 is added to the mixture in response to the detection of an increase in voltage drawn by the motor.

11 Claims, 6 Drawing Figures

APPARATUS FOR MAKING SOAP

TECHNICAL FIELD

This invention relates generally to making soap, and particularly to a method and apparatus for making liquid soap in relatively small quantities in the home with surplus fats and greases.

BACKGROUND OF THE INVENTION

Methods and apparatus have heretofore been devised for making liquid soap in relatively small quantities for domestic use. Exemplary of such prior art methods and apparatus are those disclosed in U.S. Pat. Nos. 64,099, 2,800,398, 2,876,082 and 2,879,143. These devices have included means for supplying animal or vegetable tallow or fat and a caustic alkali in measured quantities into a heated mixing chamber into which water is also fed. Some of the apparatus also have means for transferring liquid soap to a dispenser following saponification.

The prior art methods and apparatus apparently have not met with substantial commercial success due to inconsistency of the quality of the liquid soap that is produced by their use. To make good liquid soap in an automated, timed process where a mixture of fat, caustic and water is agitated in a heated vessel so that the soap has consistently reliable and homogeneous viscosity, texture and feel, the process would require that substantial complete saponification occur between the soap making ingredients. However, in making liquid soap in a mechanical, timed process in the typical home it is anticipated that the various animal and vegetable fats that are available in the home will be used, often even mixed together, and added to the other ingredients. If a single type and quantity of caustic is used to react with a variety of fats and combinations of fats in varying volumes, a set time for mixing the ingredients does not always coincide with the period required for proper saponification, and an automated, timed process does not always function to provide a desirable product. In other words, some fats react with a particular alkali of a particular strength in so much time while others take a shorter or longer period to saponify. Too short a mixing period will mean that some of the ingredients will not have had enough time in which to react, thereby leaving fat in the product which produces a greasy feel. Conversely, too long a mixing period is not energy efficient and can cause, with a measured quantity of diluent, the viscosity of the soap to become excessive.

Compounding the problem is the fact that when a soap mixture is being agitated to cause saponification, there are likely to be several viscosity changes throughout the mixing process, and the use of viscosity sensors alone is not reliable to determine proper saponification of the mixture. Also, if agitating the mixture under elevated temperature is suspended prior to proper saponification, further saponification is likely to occur while the liquid soap is in storage, thereby causing the viscosity of the soap to become excessive. The problem is even further compounded by the use of too much fat in comparison to too little alkali and vice versa. These problems have provided a severe restriction on the acceptability of those methods and apparatuses for producing soap except where such is done on a mass commercial basis as is carried out in commercial factories. The present invention therefore is directed at overcoming limitations and restrictions of the prior art methods and apparatuses for producing liquid soap in limited quantities in the home.

SUMMARY OF THE INVENTION

Briefly described, the present invention comprises methods and apparatus for making soap in the home in small quantities, with the use of fats and greases, some of which may be left over from the cooking of foods, and with caustic and water. These ingredients are mixed together in predetermined quantities and are agitated and heated, and viscosity changes of the mixture are automatically monitored until proper saponification of the mixture is determined, whereupon the heating and agitation of the mixture is terminated. Also, the various caustics and other ingredients to be mixed with the fat are prepackaged in special containers of predetermined size and shape for the purpose of providing each variety of caustic and other ingredients in the proper volume with a proper volume of fat and water.

Accordingly, it is a general object of the present invention to provide improved methods and apparatus for making liquid soap in limited quantities.

More specifically, it is an object of the invention to provide a method of making liquid soap efficiently in small quantities from various soap-making ingredients with the soap being of a consistently good quality.

Another object of the invention is to provide soap-making apparatus into which sealed containers of different soap-making ingredients may be inserted and interchanged.

In one form of the invention a method of making liquid soap comprises the steps of mixing ingredients which include a fat and an alkali with electric motor powered mixing means to form a viscous solution while monitoring motor armature current. The solution is diluted each time the motor armature current is detected to rise from relatively low quiescent levels to relatively high levels to cause the motor armature current to return to quiescent levels until motor armature current is detected to remain for a predetermined period at quiescent levels, thereby indicating that substantially complete saponification of the mixture has occurred.

In another form of the invention apparatus for making liquid soap comprises a mixing vessel, mixing means including an electric motor for mixing fat with alkali in the mixing vessel, and means for introducing a diluting agent into the mixing vessel through dilution valve means. The apparatus also includes means for sensing motor armature current drawn by the electric motor and means for controlling the dilution valve means in response to changes in levels of motor armature current sensed by the current sensing means.

In another form of the invention apparatus for making liquid soap comprises a mixing vessel in which a fat is mixed with an alkali, a container for containing an alkali, and means for feeding alkali from the container into the mixing vessel. The apparatus also has a receptacle for containing and heating fat and means for gravity feeding heated fat from the receptacle into the mixing vessel. The receptacle has two open-top compartments above which baffle means are pivotably mounted for directing fat gravity-fed downwardly towards the receptacle alternately into one and the other of the two compartments.

In still another form the invention comprises a container having a plurality of compartments for separately containing an alkali and soap additives such as dyes, fragrances and surfactants. The container is used with the apparatus which includes means for feeding the alkali and additives from the container into a mixing vessel through a plurality of valves. The apparatus further has means for controlling the valves which includes electrical switch means operatively associated with the container.

Other objects and forms of the the invention will become apparent from reading the following description and from a review of the accompanying drawings.

DETAILED DESCRIPTION

Figure 1:
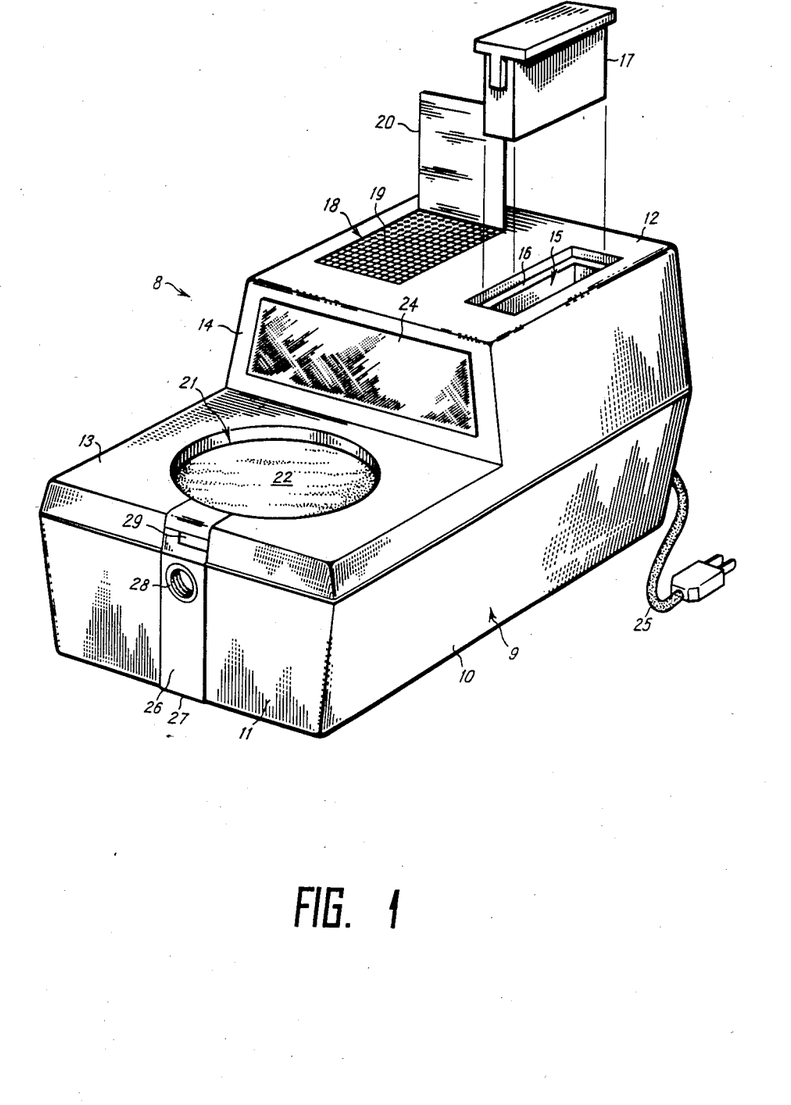
FIG. 1 is a perspective view of apparatus for making soap in accordance with principles of the invention.

Referring now in more detail to the drawing, in which like numerals refer to like parts throughout the several views, FIG. 1 illustrates apparatus 8 for making liquid soap in accordance with the present invention including a housing 9 having side walls 10, a front wall 11, and two top surfaces 12 and 13 that are of different heights connected by an inclined intermediate wall 14. The top 12 has a recess 15 provided with a lip or ledge 16 into which a container 17 may be removably seated. This container is herein termed a "soap pack" which is subsequently described in more detail. The top surface 12 is provided with another opening 18 which is covered with a removable strainer 19 and which may be closed by means of a lid 20 which is pivotably mounted to the top 12. The lower top surface 13 is provided with a circular opening 21 which is overlaid with a filter 22. The opening 18 is adapted to receive a supply of water while the opening 21 is adapted to receive various liquid fats.

The inclined intermediate wall 14 supports a display panel 24 behind which unshown touch-sensitive actuation buttons and indicator lights are mounted. An electric cord 25 extends from the rear wall of the housing. A soap drain 26 is pivotably mounted at a hinge 27 to the front wall 1 which drain includes an exit port 28. To drain, a finger is manually placed under a recess lip 29 to pivot the drain 26 downwardly.

Figure 2:
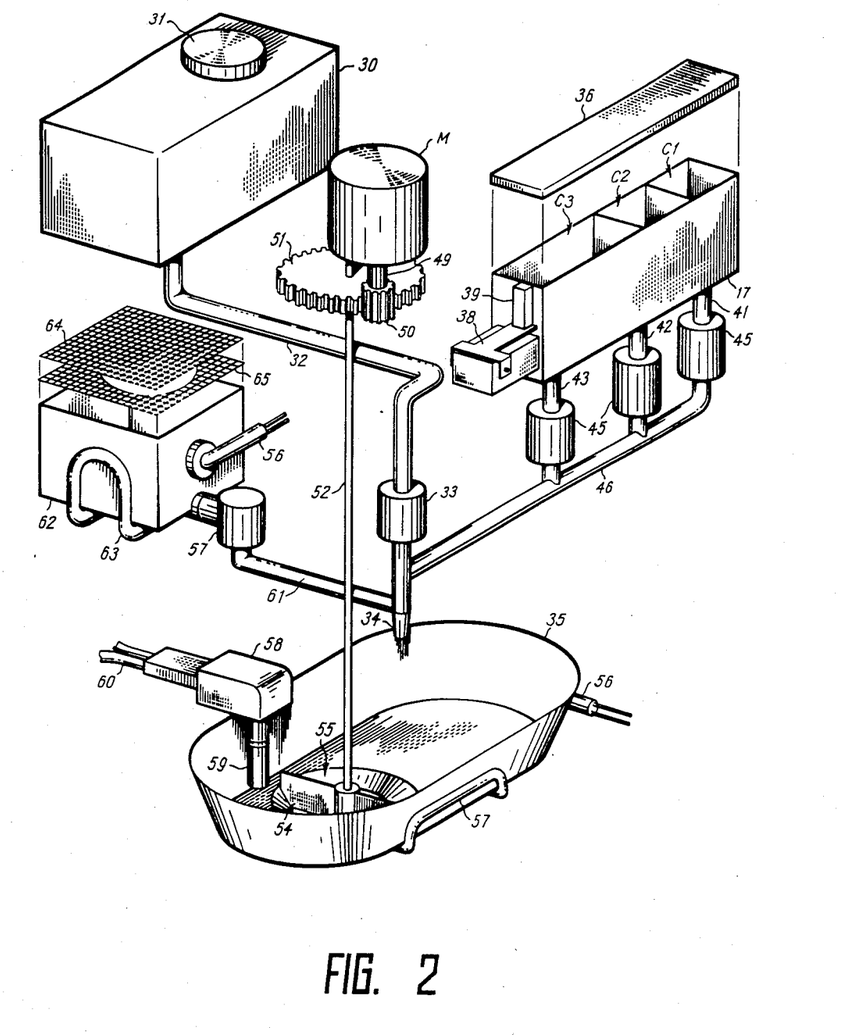
FIG. 2 is a perspective view of internal components of the apparatus illustrated in FIG. 1 spacially rearranged for clarity of explanation.

With reference next to FIG. 2, the soap-making apparatus is further seen to include a water tank 30 having a cap 31 mounted to the top thereof beneath the removable strainer 18. A conduit 32 extends from the bottom of the water tank through a water valve 33 to an outlet 34 positioned above a mixing tray 35. The soap pack 17 is seen in more detail to be divided into three compartments C1, C2 and C3. When filled, soap pack 17 will contain, for example, a 20% to 50% solution of potassium hydroxide in compartment C1, additives such as fragrances, dyes, a slight surfactant, and a buffer such as lauric acid in compartment C2, and detergents in compartment C3. The top of the soap pack 17 is sealed with a cover 36. A switch is mounted in housing 9 adjacent the position to be occupied by the soap pack which has a blade 38 mounted beneath a rib 39 of the soap pack. Three conduits 41, 42 and 43 extend downwardly from compartments C1, C2, and C3, respectively, through three valves 45 to a common conduit 46 which communicates with conduit 32. The switch 38 is operatively associated with one or more of the valves 45. Thus, depending on whether or not a particular soap pack has or does not have the rib 39, the switch controls the selection of the operation of one or more of the valves 45.

With continued reference to FIG. 2, the apparatus is further seen to include a d.c. motor M having an output shaft 49 to the lower end of which a pinion 50 is rigidly mounted. The pinion 50 is in mesh with a reduction gear 51 from which a drive shaft 52 depends downwardly into the soap mixing tray 35. A mixer blade 54 is mounted to the lower end of the drive shaft 52 within a bottom recess 55 formed in the mixing tray. An electrical heating element 57 is mounted in thermal contact with the mixing tray 35. A pH detector 58 is optionally provided with a detector element 59 depending downwardly into the mixing tray from which electric leads 60 extend to a display light on the panel 24. A fat receptacle 62 is provided which has a heating element 63 mounted in thermal contact therewith for driving off fat moisture. A strainer 64 such as filter paper 65 is mounted above the receptacle. A heat sensor 56 is attached to fat receptacle 62 and solenoid-actuated valve 57 is positioned in a drain line 61 which communicates with conduit 32 just above outlet 34.

Figure 3:
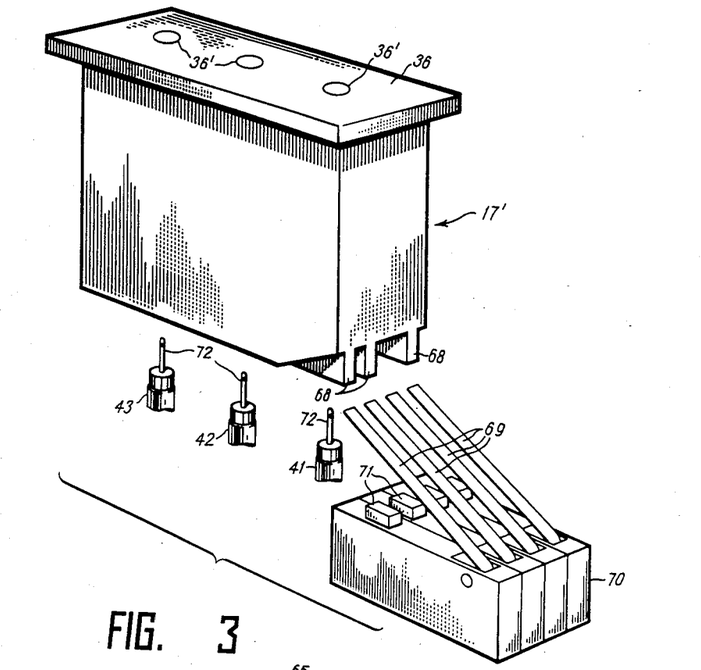
FIG. 3 is an exploded view, in perspective, of a container for soap-making ingredients used with the apparatus illustrated in FIG. 1 together with a switch bank.

With reference next to FIG. 3 a soap pack 17' is shown having valve acuation means of alternative construction for activating the valves 45 associated with the compartments C1, C2 and C3. These valve selection and actuation means include a set of ribs 68 that depend downwardly from the bottom of the receptacle. The ribs are positionally coded to engage selectively individual elements of a gang of switch blades 69 that are spring biased upwardly from a switch housing 70. Thus, when a particular soap pack 17', for example one containing ingredients for making hand soap from household fat, is manually seated within the recess 15 of housing 9 the three ribs 68 depress three of the four switch blades bringing the depressed three into contact with switch elements 71 mounted to the top of the housing 71. The apparatus control system thereupon is programmed to actuate particular ones of the valves 45 for certain time intervals when a soap-making operation is initiated.

In response to the insertion of the soap pack 17' into the recess 15 of housing 9, needles 72 that project upwardly from the ends of conduits 41, 42 and 43 puncture the bottom of compartments C1, C2 and C3, respectively. Thus, by the single manipulation of inserting the soap pack, which has been factory sealed for safety and conservation of ingredients packaged therein, fluid communication is established with the various compartments C1, C2 and C3 and the conduit 46 through the valves 45. Small vents are then manually punctured in the thin cover areas 36' (FIG. 3) in the top of the soap pack 17' over each compartment C1, C2 and C3. Upon electrical activation of the apparatus the valves 45 are selectively opened to permit drainage of the ingredients from the various vented soap pack compartments which have been selected in accordance with the coded array of ribs that are provided for a particular pack. In this manner it is seen that different soap packs designed for different usages, such as for dish washing or hand lotions, are automatically programmed by the mere insertion of the soap pack 17' into the housing 9 without having to reset dials manually or push various buttons. In this manner consumer error and potential injury by contact with the packaged ingredients is avoided.

Figure 4:
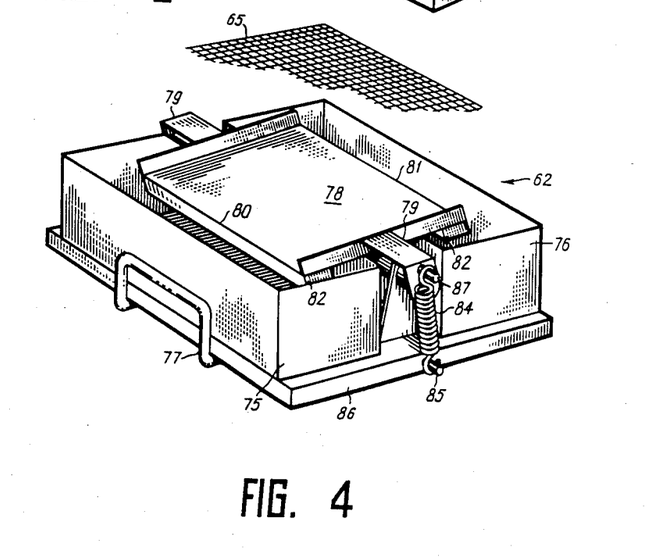
FIG. 4 is a perspective view of a fat receptable component of the apparatus with its strainer shown suspended thereover.

With reference next to FIG. 4, a fat receptacle 62 of alternative construction is seen to include two parallel, open-top compartments 75 and 76 against which heating elements 77 are placed in thermal contact for heating the receptacle and filters therefore. A baffle 78 is seen to be mounted on a pivot bar 79 with one baffle edge 80 positioned above one compartment 75 and the opposite baffle edge 81 positioned above the other open-top compartment 76. Floats 82 are mounted to the bottom of the baffle adjacent edges 80 and 81. A tension spring 84 is mounted between a pin 85 in the base 86 of the fat receptacle and pin 87 which projects outwardly from the end of pivot bar 79. The spring is mounted so as to effect an over-center tripping of the baffle once it has been moved from one tilt orientation to another by means of the floats 82 having been alternately raised or lowered, depending on the level of the fatty solution therebeneath. So constructed, fat deposited upon strainer 64 and filter 65 is heated, melts, and oozes down through the strainer and filter onto the baffle 78 which is tilted either to the left or to the right, as viewed in FIG. 4, so as to direct the fat into compartment 75 or 76 of fat receptacle 62. When that compartment is filled the baffle is tilted, by the action of the floats and over-center spring, so that additional fat is deposited into the other compartment. Position-sensitive switches (not shown) are mounted to the opposite side of fat receptacle 62 and are actuated by pivot bar 79, thereby indicating the position of baffle 78. The position of baffle plate 78 provides information to the control system as to which compartment 75 or 76 was last filled with fat.

With this embodiment valve 57 (FIG. 2) in drain line 61 is a three-way valve and serves to control drainage of the two compartments alternatively in response to the position of the baffle that is detected by the unshown switch means. In this manner batches of a predetermined quantity of fat are made available for mixing with given quantities of the ingredients of the soap pack and water under control of the apparatus control system.

As has been previously mentioned, the components of the apparatus as illustrated in FIGS. 1-4 are not identical but are, in some cases, of alternative design. Thus, the fat receptacle 62 shown in FIG. 2 has but one compartment while the fat receptacle 62 of FIG. 4 has two. A soap drain 26 for the mixing tray 35 is illustrated in FIG. 1 but, for simplicity, has not been shown in FIG. 2. The valve encoding ribs for the soap pack 17 of FIG. 1 and soap pack 17' of FIG. 3 are also different. The water tank 30 in FIG. 2 is capped while a similar water tank (not shown) which would be used in FIG. 1 beneath the strainer would ordinarily be of open-top configuration. Again, this has been done to show preferred alternatives.

Figure 5:
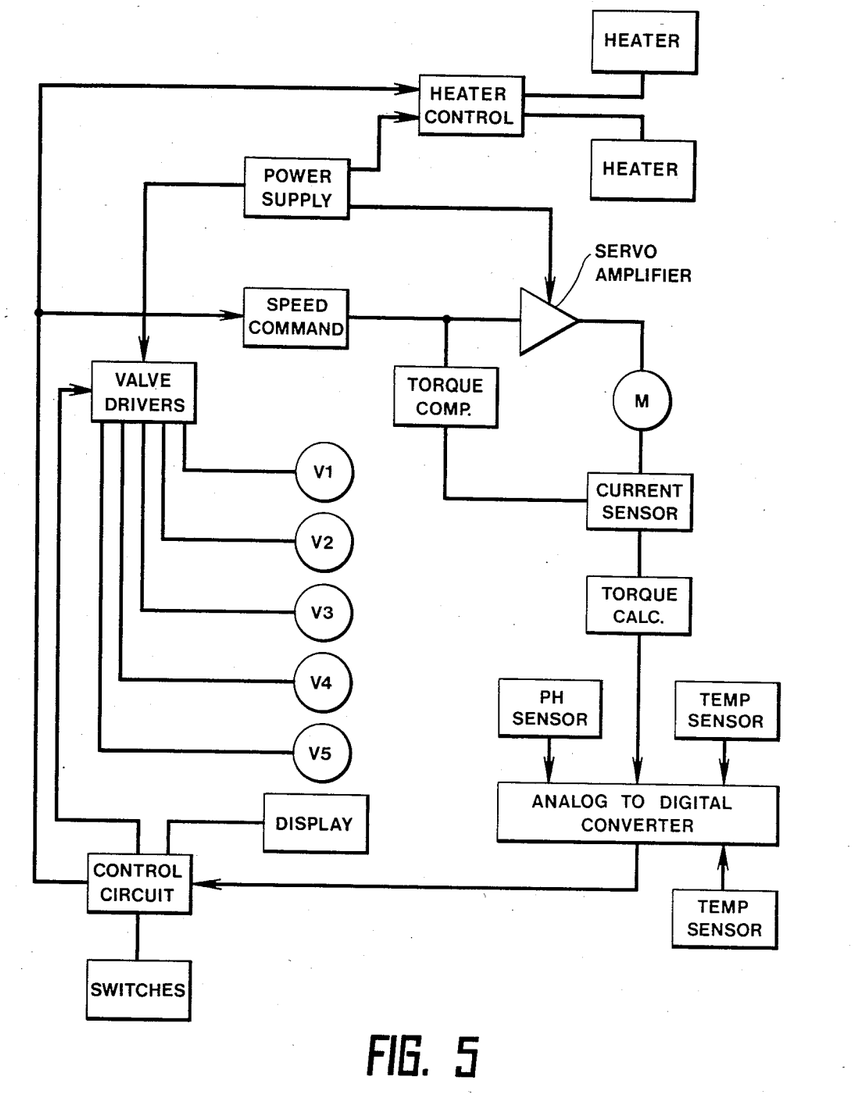
FIG. 5 is a block diagram of the apparatus control system.

A conventional electrical control system is employed for operating the apparatus 8 as is shown in block diagram form in FIG. 5. The system is seen to include a control circuit, preferably in the form of a microprocessor into which digital data is fed from an analog to digital converter. This data includes pH information from a pH sensor, temperature information from two temperature sensors and motor torque information calculated from sensed motor armature current. This torque, which is proportional to the viscosity of the soap, is determined from motor armature current by expression $T = K_t \phi I_a$ where $K_t$ is a torque constant, $\phi$ is armature flux, and $I_a$ is armature current. The switches of the block diagram correspond to the switches 38 and 69 (FIGS. 2 and 3) for system actuation and selective soap pack valve control.

The control circuit control, through solenoid-type valve drivers, a set of valves V1-V5 which correspond to the five valves 33, 41, 42, 43 and 57 illustrated in FIG. 2. The control circuit, i.e. a microprocessor, controls the apparatus heaters through heater controller and motor speed. A power supply also is included for powering the valve drives and the motor M through a servo amplifier.

Motor torque sensing means also is provided and its output is fed to the microprocessor which is shown in the drawing as a control circuit block. Such torque, which is proportional to the viscosity of the soap, is determined from motor armature current as expressed by the equation $T = K_t \phi I_a$ where $K_t$ is a torque constant, $\phi$ is armature flux, and $I_a$ is armature current.

Figure 6:
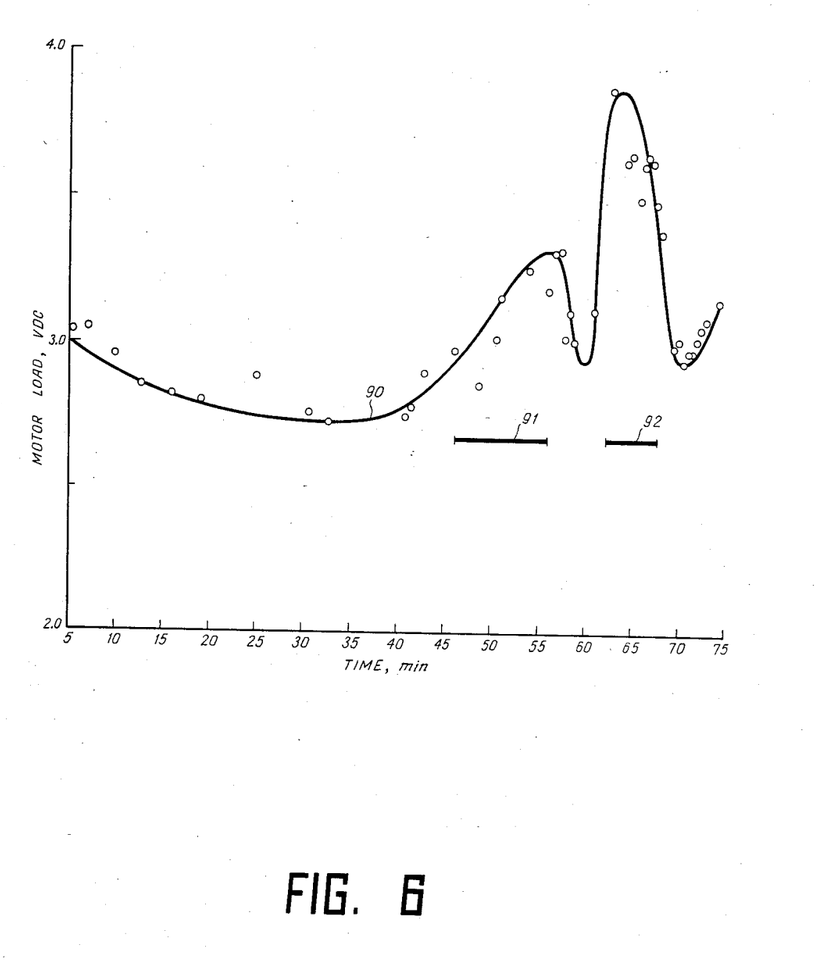
FIG. 6 is a graph in which voltage is plotted against apparatus operating time and which shows two time periods during which water is added to a mixture of fat and alkali in promoting saponification in accordance with principles of the invention.

FIG. 6 graphically illustrates, by way of experiment, that by adding a diluent to a mixture of fat and an alkali during periods of viscosity increases, substantially complete saponification can be achieved within a reasonable time frame to provide liquid soap of good quality. In FIG. 6 each of the dots represents an actual measurement made when 12 grams of 50% solution of KOH was used as a caustic on 50 grams of animal fat with 12 grams of water used as the diluent, with mixing done at 150° F. The curve 90 is thus drawn based upon empirical data with the measurements made between 45 and 52 minutes somewhat off of the curve during a brief period of stirrer malfunction. The curve here is a plot of volts d.c. measured across a resistor placed in series circuit with the motor armature circuit against time which is proportional to torque in accordance with the previous equation and Ohm's law. Upon an initial five minutes of mixing of potassium hydroxide with fat, the voltage and thus the current were observed to be of a relatively low value of some 2.7 VDC, which is indicative of low viscosity. Voltage began to increase at approximately 40 minutes and at 47 minutes water was intermittently added to the solution, as indicated by the line 91 on the graph. At 55 minutes the viscosity had risen to a point where some 3.5 VDC were indicated, whereupon there was observed an abrupt fall-off in voltage indicating a decrease in viscosity whereupon the addition of water was suspended. At approximately 60 minutes the viscosity was again seen to increase abruptly, indicative of further saponification, so that at 61 minutes the voltage had increased to approximately 3.9 VDC whereupon water was again added. This is indicated by line 92 on the graph. The viscosity was observed to decrease rapidly back down to approximtely where it was before this second peak. Once again, after a brief period of time, at about 71 minutes, viscosity was again seen to increase. This particular experiment was then terminated.

Other experiments have confirmed applicant's discovery that by monitoring viscosity and by periodically adding a diluent to a heated mixture of alkali and fat, viscosity will tend to rise several times, and during such periods of increased viscosity if a diluent is added to the solution the diluent will lower the viscosity of the soap mixture. By repeating this several times, such as typically some five to six times, viscosity will finally remain low for an indefinite period.

It appears that in this manner a complete saponification of a soap mixture takes place over relatively short periods of high viscosity in making relatively small quantities of liquid soap. If the solution is diluted very substantially following the first increase of viscosity and left at that, an insufficient reaction will have occurred even though a very dilute body of soap is produced, and the quality of such soap is poor in that it produces a greasy feel, indicative of an incomplete reaction. Conversely, if water is continuously added throughout the mixing process at a very slow rate the time required in producing good quality soap is far too long to be practical for making discrete amounts of liquid soap in small quantities.

The process can be used in making liquid soap by mixing any known animal or vegetable fats, such as lard, bacon fat, tallow, Crisco oil or other organic fatty acid with preferably a strong base-type caustic agent such as a 50% solution of potassium hydroxide. Soap also has been made with the disclosed process when using peanut oil, safflower oil, vegetable oil, sunflower oil, olive oil and home mixtures of cooking fats.

It thus is seen that a method and apparatus is provided for making consistently good quality liquid soap in relatively small quantities. It should however be understood that the described embodiments merely illustrate principles of the invention in selected, preferred forms. Many modifications, additions and deletions may, of course, be made thereto without departure from the spirit and scope of the invention as set forth in the following claims.

I claim:

1. Household sized soap making apparatus for making small quantities of liquid soap from household cooking greases and the like comprising a housing comprising a mixing vessel, a grease receptacle for receiving and storing household waste grease, an alkali container for storing a liquid alkali, diluent supply means, conduit means extending from each of said grease receptacle, alkali container and diluent supply means to said mixing vessel for delivering grease, alkali and diluent to said mixing vessel, valve means operatively connected to said conduit means for controlling the delivery of grease, alkali and diluent to said mixing vessel, mixing means including a mixing blade positioned in said mixing vessel and an electric motor in driving relationship with said mixing blade for mixing the grease, alkali and diluent in said mixing vessel, means for sensing motor current drawn by said electric motor, and means for controlling said valve means to control the delivery of diluent in response to changes in levels of motor current sensed by said current sensing means so that when the viscosity of the soap being formed in the mixing vessel increases the motor current also increases and the control means actuates the valve means to deliver diluent to the mixing vessel.

2. The apparatus of claim 1 further comprising heater means for heating grease in said grease receptacle.

3. The apparatus of claim 1 wherein said grease receptacle has two compartments, pivotable baffle means for directing grease gravity feed downwardly towards said receptacle alternately into one and the other of said compartments, and wherein said conduit means extending from each of said grease receptacle, alkali container and diluent supply means to said mixing includes a valve controlled conduit extending from each of said compartments.

4. The apparatus of claim 1 and wherein said alkali container includes a plurality of compartments for separately containing an alkali and soap additives, and wherein said conduit means includes means for delivering alkali and soap additives from said compartments to said mixing vessel.

5. The apparatus of claim 1 wherein said motor current sensing means includes means for sensing motor armature current.

6. Household size soap making apparatus for making liquid soap in small quantities from household greases and the like comprising a housing containing a mixing vessel in which grease is to be mixed with an alkali, an alkali container for containing an alkali, means for feeding alkali from said container into said mixing vessel, a receptacle comprising at least one open top compartment for receiving and storing household waste grease, heating means for heating said receptacle, means for gravity feeding heated grease from said receptacle into said mixing vessel, a diluent supply means for delivering diluent to said mixing vessel, mixing means for mixing the grease and alkali in said mixing vessel, and control means responsive to a change of the viscosity of the mixture in said mixing vessel to deliver diluent from said diluent supply means to said mixing vessel.

7. The apparatus of claim 6 wherein said receptacle comprises two open top compartments, and further including a tiltable baffle means mounted in said housing over said compartments and tiltable in one direction to gravity feed grease to one compartment and tiltable in the other direction to gravity feed grease to the other compartment, and wherein said baffle means has one bouyant side located above one of said compartments and an opposite bouyant side located above the other of said compartments so that when one compartment is substantially filled with grease the bouyant side of the baffle floats on the grease and tilts the baffle.

8. The apparatus of claim 7 wherein said baffle means has a pivot located between said one bouyant side and said other bouyant side, and over-center spring means coupled to said baffle means and to said receptacle for urging said baffle to one or the other of its tilted positions.

9. The apparatus of claim 6 and wherein said diluent supply means comprises a water tank positioned in said housing and means for feeding water from said water tank into said mixing vessel.

10. Household size soap making apparatus for making liquid household soap in small quantities from household greases and the like comprising a housing containing a mixing vessel in said housing in which grease is to be mixed with an alkali, means in said housing for mixing grease and alkali in said mixing vessel, a receptacle for receiving and storing grease, means for gravity feeding grease from said receptacle into said mixing vessel, an alkali container removably supported by said housing having a plurality of compartments for separately containing an alkali and soap additives such as dyes, fragrances and surfactants, conduit means for feeding alkali and additives from said alkali container compartments into said mixing vessel, said conduit means including valves for controlling the flow through the conduit means, diluent supply means for delivery diluent to said mixing vessel and control means for controlling said valves including electrical switch means actuated by the presence of said alkali container, and control means responsive to a change of the viscosity of the mixture in said mixing vessel to deliver diluent from said diluent supply means to said mixing vessel.

11. The apparatus of claim 10 wherein said alkali container includes a plurality of external protrusions, and wherein said electrical switch means comprises an array of spring-biased switch blades operatively associated with the protrusions of said alkali container whereby the configuration of said alkali container while engaged with said switch array selectively actuates switches of said array of switches.

* * * * *